US008129025B2

(12) United States Patent
Wu

(10) Patent No.: US 8,129,025 B2
(45) Date of Patent: Mar. 6, 2012

(54) FLUOROTELOMER GRAFTED POLYANILINE CONTAINING INTERMEDIATE TRANSFER MEMBERS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 465 days.

(21) Appl. No.: 12/413,642

(22) Filed: Mar. 30, 2009

(65) Prior Publication Data

US 2010/0247919 A1 Sep. 30, 2010

(51) Int. Cl.

| | |
|---|---|
| ***B32B 27/08*** | (2006.01) |
| ***B32B 27/28*** | (2006.01) |
| ***B32B 27/34*** | (2006.01) |
| ***B32B 27/36*** | (2006.01) |
| ***C08G 73/00*** | (2006.01) |

(52) U.S. Cl. ..... 428/421; 428/412; 428/422; 428/473.5; 428/474.4; 428/480; 428/500; 428/522; 428/523; 525/63; 525/66

(58) Field of Classification Search ........................ None
See application file for complete search history.

(56) References Cited

U.S. PATENT DOCUMENTS 5,487,707 A 1/1996 Sharf et al.

(Continued)

FOREIGN PATENT DOCUMENTS

SU 821449 * 4/1981

OTHER PUBLICATIONS

Jin Wu, U.S. Appl. No. 12/200,074 entitled Hydrophobic Carbon Black Intermediate Transfer Components, filed Aug. 28, 2008.

(Continued)

*Primary Examiner* — Vivian Chen
(74) *Attorney, Agent, or Firm* — Oliff & Berridge, PLC

(57) ABSTRACT

An intermediate transfer media, such as a belt, that includes a fluorotelomer chemically bonded to a polyaniline.

25 Claims, No Drawings

U.S. PATENT DOCUMENTS

| | | | |
|---|---|---|---|
| 6,318,223 | B1 | 11/2001 | Yu et al. |
| 6,397,034 | B1 | 5/2002 | Tarnawskyj et al. |
| 6,440,515 | B1 | 8/2002 | Thornton et al. |
| 6,602,156 | B2 | 8/2003 | Schlueter, Jr. |
| 7,031,647 | B2 | 4/2006 | Mishra et al. |
| 7,130,569 | B2 | 10/2006 | Goodman et al. |
| 7,139,519 | B2 | 11/2006 | Darcy, III et al. |
| 7,910,183 | B2 | 3/2011 | Wu |
| 2010/0247918 | A1 | 9/2010 | Wu |
| 2010/0248102 | A1 | 9/2010 | Wu |
| 2010/0248103 | A1 | 9/2010 | Wu |
| 2010/0248104 | A1 | 9/2010 | Wu |
| 2010/0248106 | A1 | 9/2010 | Wu |
| 2010/0248107 | A1 | 9/2010 | Wu et al. |
| 2010/0248108 | A1 | 9/2010 | Wu et al. |
| 2010/0249322 | A1 | 9/2010 | Wu |

OTHER PUBLICATIONS

Jin Wu, U.S. Appl. No. 12/200,111 entitled Hydrophobic Polyetherimide/Polysiloxane Copolymer Intermediate Transfer Components, filed Aug. 28, 2008.

Jin Wu et al., U.S. Appl. No. 12/200,147 entitled Coated Seamed Transfer Member, filed Aug. 28, 2008.

Jin Wu et al., U.S. Appl. No. 12/200,179 entitled Coated Transfer Member, filed Aug. 28, 2008.

Jin Wu, U.S. Appl. No. 12/129,995 on Polyimide Intermediate Transfer Components, filed May 30, 2008.

Jin Wu, U.S. Appl. No. 12/181,354, on Core Shell Intermediate Transfer Components, filed Jul. 29. 2008.

Jin Wu, U.S. Appl. No. 12/181,409 on Treated Carbon Black Intermediate Transfer Components, filed Jul. 29, 2008.

* cited by examiner

FLUOROTELOMER GRAFTED POLYANILINE CONTAINING INTERMEDIATE TRANSFER MEMBERS

CROSS REFERENCE TO RELATED APPLICATIONS

Copending U.S. application Ser. No. 12/413,627, Publication No. 20100248103, filed Mar. 30, 2009, entitled Resin Mixture Backing Layer Containing Photoconductor, the disclosure of which is totally incorporated herein by reference, illustrates a photoconductor comprising a substrate, an imaging layer thereon, and a backing layer located on a side of the substrate opposite the imaging layer wherein the outermost layer of the backing layer adjacent to the substrate is comprised of a glycoluril resin, and a polyol resin mixture.

Copending U.S. application Ser. No. 12/413,633, U.S. Publication No. 20100249322, filed Mar. 30, 2009, entitled Fluorinated Sulfonic Acid Polymer Grafted Polyaniline Containing Intermediate Transfer Members, the disclosure of which is totally incorporated herein by reference, illustrates an intermediate transfer member comprised of a substrate, and in contact therewith a polyaniline having grafted thereto a fluorinated sulfonic acid polymer.

Copending U.S. application Ser. No. 12/413,638, Publication No. 20100247918, filed Mar. 30, 2009, entitled Perfluoropolyether Polymer Grafted Polyaniline Containing Intermediate Transfer Members, the disclosure of which is totally incorporated herein by reference, illustrates an intermediate transfer member comprised of a substrate and in contact with the substrate a polyaniline grafted perfluoropolyether phosphoric acid polymer.

Copending U.S. application Ser. No. 12/413,645, now U.S. Pat. No. 7,910,183, filed Mar. 30, 2009, entitled Layered Intermediate Transfer Members, the disclosure of which is totally incorporated herein by reference, illustrates an intermediate transfer member comprised of a polyimide substrate, and thereover a polyetherimide/polysiloxane.

Copending U.S. application Ser. No. 12/413,651, U.S. Publication No. 20100248106, filed Mar. 30, 2009, entitled Polyimide Polysiloxane Intermediate Transfer Members, the disclosure of which is totally incorporated herein by reference, illustrates an intermediate transfer member comprised of at least one of a polyimide/polyetherimide/polysiloxane, and a polyimide polysiloxane.

Copending U.S. application Ser. No. 12/413,783, U.S. Publication No. 20100248107, filed Mar. 30, 2009, entitled Glycoluril Resin And Polyol Resin Members, the disclosure of which is totally incorporated herein by reference, illustrates a process which comprises providing a flexible belt having at least one welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a resin mixture of a glycoluril resin and a polyol resin.

Copending U.S. application Ser. No. 12/413,795, U.S. Publication No. 20100248108, filed Mar. 30, 2009, entitled Glycoluril Resin And Polyol Resin Dual Members, the disclosure of which is totally incorporated herein by reference, illustrates a process which comprises providing a flexible belt having at least one welded seam extending from one parallel edge to the other parallel edge of the coating, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and a polyol resin.

Copending U.S. application Ser. No. 12/413,832, U.S. Publication No. 20100248104, filed Mar. 30, 2009, entitled Polyaniline Dialkylsulfate Complexes Containing Intermediate Transfer Members, the disclosure of which is totally incorporated herein by reference, illustrates an intermediate transfer member comprised of a polyaniline dialkylsulfate complex.

Copending U.S. application Ser. No. 12/413,852, U.S. Publication No. 20100248102, filed Mar. 30, 2009, entitled Crosslinked Resin Mixture Backing Layer Containing Photoconductor, the disclosure of which is totally incorporated herein by reference, illustrates a photoconductor comprising a substrate, an imaging layer thereon, and a backing layer located on a side of the substrate opposite the imaging layer wherein the outermost layer of the backing layer adjacent to the substrate is comprised of a mixture of glycoluril resin and a polyacetal resin mixture.

Illustrated in U.S. application Ser. No. 12/200,074, U.S. Publication No. 20100055463, entitled Hydrophobic Carbon Black Intermediate Transfer Components, filed Aug. 28, 2008, the disclosure of which is totally incorporated herein by reference, is an intermediate transfer member comprised of a substrate comprising a carbon black surface treated with a poly(fluoroalkyl acrylate).

Illustrated in U.S. application Ser. No. 12/200,111, now U.S. Publication No. 20100055445, entitled Hydrophobic Polyetherimide/Polysiloxane Copolymer Intermediate Transfer Components, filed Aug. 28, 2008, is an intermediate transfer member comprised of a substrate comprising a polyetherimide polysiloxane copolymer.

Illustrated in U.S. application Ser. No. 12/200,147, U.S. Publication No. 20100055328, entitled Coated Seamed Transfer Member, filed Aug. 28, 2008, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179, U.S. Publication No. 20100051171, entitled Coated Transfer Member, filed Aug. 28, 2008, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 12/129,995, now U.S. Pat. No. 8,005,410, filed May 30, 2008, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of for example, from about 175°

C. to about 290° C. over a period of time of from about 10 minutes to about 120 minutes.

Illustrated in U.S. application Ser. No. 12/181,354, filed Jul. 29, 2008, now U.S. Pat. No. 7,985,464, entitled Core Shell Intermediate Transfer Components, the disclosure of which is totally incorporated herein by reference, is an intermediate transfer belt comprised of a substrate comprising a conductive core shell component.

Illustrated in U.S. application Ser. No. 12/181,409, filed Jul. 29, 2008, now U.S. Pat. No. 7,738,824, entitled Treated Carbon Black Intermediate Transfer Components, the disclosure of which is totally incorporated herein by reference, is an intermediate transfer members comprised of a substrate comprising a poly(vinylalkoxysilane) surface treated carbon black.

BACKGROUND

Disclosed are intermediate transfer members, and more specifically, intermediate transfer members useful in transferring a developed image in an electrostatographic, for example xerographic, including digital, image on image, and the like, machines or apparatuses and printers. In embodiments, there are selected intermediate transfer members comprised of a fluorotelomer grafted polyaniline (PANI), and more specifically, where a fluorotelomer is attached or grafted to a polyaniline surface by, for example, an in situ process. The polyaniline, in embodiments, is hydrophilic or substantially hydrophilic, and is also conductive. Furthermore, disclosed herein is a hydrophobic intermediate transfer member comprised of a hydrophobic polyaniline conductive component having a conductivity of about $10^{-8}$ to about $10^{2}$ S/cm, where the hydrophobic polyaniline component is in situ formed with a fluorotelomer.

In embodiments of this disclosure, there is provided an intermediate transfer member, such as an intermediate belt (ITB); a hydrophobic intermediate transfer member comprised of a hydrophobic polyaniline conductive component, where the hydrophobic polyaniline component is an in situ formed fluorotelomer grafted polyaniline, and more specifically, where the fluorotelomer is in situ attached onto a polyaniline surface during milling of the ITB coating dispersion also comprising polyaniline, and a second polymer such as a polyimide, a polycarbonate, a polyamidimide, a polyphenylene sulfide, a polyamide, a polysulfone, a polyetherimide, a polyester such as polybutylene terephthalate (PBT) or polyester copolymer, polyvinylidene fluoride (PVDF), polyethylene-co-polytetrafluoroethylene, and mixtures thereof in organic solvents.

In embodiments, the in situ grafting of a fluorotelomer onto the polyaniline surface is completed by the nucleophilic substitution between the iodine atom of the fluorotelomer and the amine of the polyaniline, which renders the resulting particles hydrophobic as illustrated herein.

The ITB member comprised of the disclosed hydrophobic fluorotelomer grafted polyaniline is, for example, hydrophobic, such as an about 20 percent more hydrophobic as determined by an about 20 degrees higher contact angle as compared to an ITB that does not contain the grafted polyaniline and the disclosed member also exhibited about an 80 percent lower surface resistivity than the non grafted polyaniline member. Additionally, the fluorotelomer functions as a fluorinating agent to increase the hydrophobicity of the ITB, and also acts as an oxidative dopant to render an increase or maintain the conductive characteristics of the ITB. In addition, primarily because of the ITB water repelling properties determined, for example, by accelerated aging experiments at 80° F./80 percent humidity, for four weeks, the surface resistivity of the disclosed hydrophobic ITB member remained unchanged, while that of the controlled non grafted ITB member decreased to about ⅙ of its original value.

A number of advantages are associated with the intermediate transfer members, such as belts (ITB) of the present disclosure, such as an excellent maintained conductivity or resistivity for extended time periods; dimensional stability; ITB humidity insensitivity for extended time periods; excellent dispersability in a polymeric solution; low and acceptable surface friction characteristics; and high fidelity transfer.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant. Generally, the electrostatic latent image is developed by contacting it with a developer mixture comprised of a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt, or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members possess a number of advantages, such as enabling high throughput at modest process speeds; improving registration of the final color toner image in color systems using synchronous development of one or more component colors and using one or more transfer stations; and increasing the number of substrates that can be selected. However, a disadvantage of using an intermediate transfer member is that a plurality of transfer operations is usually needed allowing for the possibility of charge exchange occurring between toner particles, and the transfer member which ultimately can lead to less than complete toner transfer, resulting in low resolution images on the image receiving substrate, and image deterioration. When the image is in color, the image can additionally suffer from color shifting and color deterioration.

Attempts at controlling the resistivity of intermediate transfer members by, for example, adding conductive fillers, such as ionic additives and/or carbon black to the outer layer, are disclosed in U.S. Pat. No. 6,397,034, which describes the use of fluorinated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 percent to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use. This can limit the process and operational latitude, and eventually the ion filled polymer member will be unusable.

Therefore, it is desired to provide an intermediate transfer member, which has excellent hydrophobic and transfer capabilities; is conductive with a bulk conductivity of from about $10^{-14}$ to about $10^{-7}$ S/cm, and more specifically, has improved conductivity as compared, for example, to an intermediate transfer member where the grafted polymer illustrated herein is absent; possesses excellent humidity insensitivity characteristics leading to high copy quality where developed images with minimal resolution issues can be obtained. It is also desired to provide a weldable intermediate transfer belt that may not, but could have puzzle cut seams, and instead, has a weldable seam, thereby providing a belt that can be manufactured without labor intensive steps, such as manually piecing together the puzzle cut seam with fingers, and without the lengthy high temperature and high humidity conditioning steps.

A number of the known ITB formulations apply carbon black or polyaniline as the conductive species; however, this has some limitations. For example, polyaniline is readily oxidized and results in loss of conductivity, its thermal [above 200° C. Also, it can be difficult to prepare carbon black based ITBs with consistent resistivity because the required loadings reside on the vertical part of the percolation curve. The amount of carbon black and how carbon black is processed (primary particle size and aggregate size) are of value for conductivity, and for the manufacturing of intermediate belts.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt comprising a belt substrate comprising primarily at least one polyimide polymer, and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

In embodiments, there is disclosed an apparatus for forming images on a recording medium comprising a charge retentive surface to receive an electrostatic latent image thereon; a development component to apply toner to said charge retentive surface to develop said electrostatic latent image, and to form a developed image on said charge retentive surface; and an intermediate transfer media that functions to transfer the developed image from the charge retentive surface, such as a photoconductor, to a substrate like paper, wherein the intermediate transfer media is comprised of a substrate comprising a fluorotelomer that has chemically bonded thereto a polyaniline.

Illustrated herein in embodiments is an intermediate transfer member comprised of a substrate, and a layer comprised of polyaniline having grafted thereto a fluorotelomer; a transfer media comprised of a polyaniline fluorotelomer wherein the fluorotelomer is represented by $CF_3(CF_2)_nI$ wherein n represents the number of repeating groups; a transfer media comprised of a polyaniline having grafted thereto a fluorotelomer wherein the fluorotelomer is represented by $CF_3(CF_2)_nCH_2CH_2I$ wherein n represents the number of repeating groups, and which n has a value of from about 3 to about 14; an intermediate transfer member comprised of a first supporting substrate layer, and thereover a second layer comprised of polyaniline to which is grafted a fluorotelomer as represented by at least one of $$R_F\text{—}X \text{ and } R_F\text{—}R_H\text{—}X$$

wherein $R_F$ is fluoroalkyl; $R_H$ is alkyl, or aryl, and X is halogen; an intermediate transfer member, such as an intermediate belt comprised of a substrate comprising an in situ fluorotelomer attached to a polyaniline by, for example, an in situ process; an intermediate transfer member wherein the resistivity thereof is from about $10^6$ to about $10^{13}$ ohm/sq, from about $10^8$ to about $10^{12}$ ohm/sq, and more specifically, from about $10^9$ to about $10^{11}$ ohm/sq, and is about 80 percent lower than that of an intermediate belt comprised of a substrate comprising a polyaniline.

In embodiments, there is disclosed an intermediate transfer member comprised of a substrate comprising a fluorotelomer grafted to or chemically bonded to a polyaniline, and which member possesses an excellent maintained resistivity or conductivity for extended time periods. More specifically, there is substantially no relevant change in the intermediate transfer member disclosed herein surface resistivity when it is aged in A zone (80° F./80 percent humidity) for two months, in comparison to and under the same conditions, for an intermediate transfer member comprised of a substrate comprising a polyaniline with an about one order of magnitude decrease in surface resistivity.

In addition, the present disclosure provides, in embodiments, an apparatus for forming images on a recording medium comprising a charge retentive surface to receive an electrostatic latent image thereon; a development component to apply toner to the charge retentive surface to develop the electrostatic latent image, and to form a developed image on the charge retentive surface; a weldable grafted polyaniline as illustrated herein intermediate transfer belt to transfer the developed image from the charge retentive surface to a substrate, and a fixing component.

FLUOROTELOMER EXAMPLES

A number of fluorotelomers, inclusive of those commercially available, can be selected for the intermediate transfer members disclosed herein.

In embodiments, the fluorotelomers selected can be represented by at least one of $R_F$—X and $R_F$—$R_H$—X wherein $R_F$ is a fluoroalkyl with, for example, from about 1 to about 30 carbon atoms, or from about 4 to about 14 carbon atoms; $R_H$ is an alkyl, an aryl, or an alkylaryl with alkyl containing, for example, from about 1 to about 18 carbon atoms, or from about 2 to about 8 carbon atoms; aryl containing, for example, from about 6 to about 36 or from about 6 to about 18 carbon atoms, and X is a halogen like fluorine (fluoride), chlorine, bromine or iodine.

In another embodiment, examples of the fluorotelomers can be represented by at least one of $CF_3(CF_2)_nI$, $CF_3(CF_2)_nCH_2CH_2I$, $CF_3(CF_2)_n(C_6H_4)CH_2I$, $CF_3(CF_2)_n(C_6H_4)CH_2Br$, and $CF_3(CF_2)_n(C_6H_4)CH_2Cl$, where n is from about 3 to about 13.

Specific examples of the fluorotelomers represented by $CF_3(CF_2)_nI$ include ZONYL® TELA-L ($M_w$ about 525, 59.1 percent of fluorine), TELA ($M_w$ about 546, 60.1 percent of fluorine), and TELA-N ($M_w$ about 596, 60.6 percent of fluorine); and specific examples of the $CF_3(CF_2)_nCH_2CH_2I$ fluorotelomers include ZONYL® TELB-L ($M_w$ about 553, 56.1 percent of fluorine), TELB ($M_w$ about 574, 57.2 percent of fluorine), and TELA-N ($M_w$ about 624, 57.9 percent of fluorine), all commercially available from E. I. DuPont.

The fluorotelomer is present in an amount of from about 0.03 to about 15 percent by weight, or from about 0.6 to about 12 percent by weight based on the weight of total intermediate transfer member solids.

EMBODIMENTS

Examples that illustrate the formation of the grafted fluorotelomer polymers selected for the intermediate transfer members disclosed are, for example, represented by

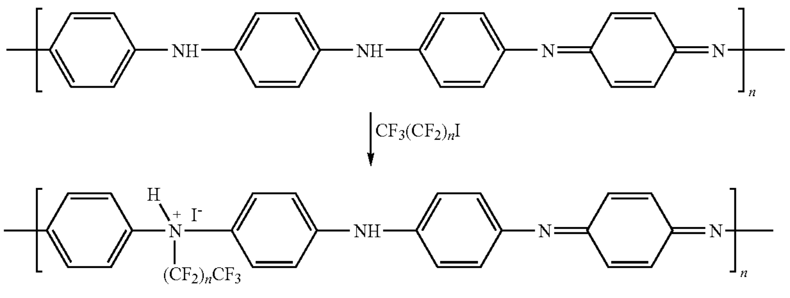

where n represents the number of repeating groups, and is, for example, from about 3 to about 15, from about 3 to about 13, from 1 to about 10, from 7 to about 10, and the like.

More specifically, an ITB coating dispersion is prepared by mixing or milling polyaniline, the fluorotelomer, and a polymer such as a polyimide, a polycarbonate, a polyamidimide, a polyphenylene sulfide, a polyamide, a polysulfone, a polyetherimide, a polyester such as polybutylene terephthalate (PBT) or a polyester copolymer, polyvinylidene fluoride (PVDF), polyethylene-co-polytetrafluoroethylene, and mixtures thereof in organic solvents at ambient temperatures (about 20 to 25° C.) for about 8 to about 24 hours.

Yet, more specifically, about 1 part of a polyaniline can be mixed with 12 parts of a polycarbonate/copolyester resin blend, 0.2 part of a fluorotelomer, and 150 parts of methylene chloride. By ball milling this mixture with 2 millimeter stainless shot overnight, or 23 hours at temperatures from about 20° C. to about 40° C., a uniform dispersion is obtained, and where the polyaniline is in situ grafted with the fluorotelomer.

Examples of the polyaniline component are comprised, for example, of relatively small particles with a size diameter of, for example, from about 0.5 to about 5 microns, from about 1.1 to about 2.3 microns, from about 1.2 to about 2 microns, from about 1.5 to about 1.9 microns, or about 1.7 microns. Specific examples of polyanilines selected for the transfer member, such as an ITB, are PANIPOL™ F, commercially available from Panipol Oy, Finland.

Examples of additional components present in the intermediate transfer member are a number of known polymers and conductive components.

Examples of polymeric binders that, in embodiments, may be included in the intermediate transfer member are polyimides (thermosetting or thermoplastic), polycarbonate, polyester such as poly(ethylene terephthalate) (PET), poly(ethylene naphthalate) (PEN) and poly(butylene terephthalate) (PBT), polypolyvinylidene fluoride (PVDF), polyethylene-co-polytetrafluoroethylene, polyamidimide, polyphenylene sulfide, polyamide, polysulfone, polyetherimide, polyester copolymer, rapidly cured polyimide polymers such as VTEC™ PI 1388, 080-051, 851, 302, 203, 201 and PETI-5, all available from Richard Blaine International, Incorporated, Reading, Pa. The thermosetting polyimides are cured at suitable temperatures, and more specifically, from about 180° C. to about 260° C. over a short period of time, such as, for example, from about 10 to about 120, and from about 20 to about 60 minutes; possess, for example, a number average molecular weight of from about 5,000 to about 500,000, or from about 10,000 to about 100,000, and a weight average molecular weight of from about 50,000 to about 5,000,000, or from about 100,000 to about 1,000,000; thermosetting polyimide precursors that are cured at higher temperatures (above 300° C.) than the VTEC™ PI polyimide precursors, and which precursors include, for example, PYRE-M.L® RC-5019. RC-5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN and FN, commercially available from E.I. DuPont, Wilmington, Del.; in amounts of, for example, from about 70 to about 97, or from about 80 to about 95 weight percent of the intermediate transfer member.

Examples of specific selected thermoplastic polyimides are KAPTON® KJ, commercially available from E.I. DuPont, Wilmington, Del., as represented by

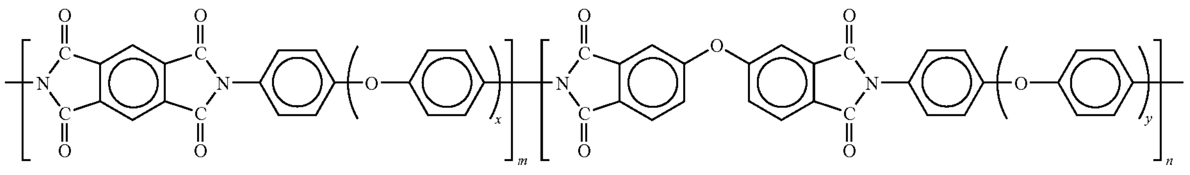

wherein x is equal to 2; y is equal to 2; m and n are from about 10 to about 300; and IMIDEX®, commercially available from West Lake Plastic Company, as represented by

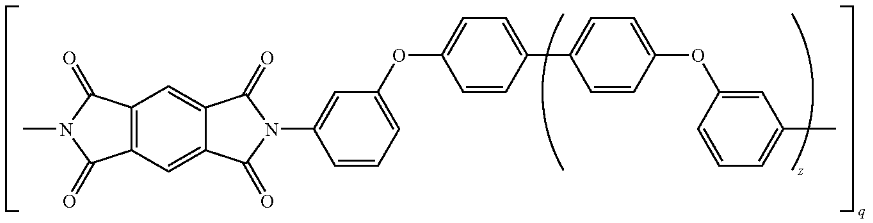

wherein z is equal to 1, and q is from about 10 to about 300.

Examples of polycarbonate binders selected include poly(4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl) carbonate (also referred to as bisphenol-C-polycarbonate), and the like. In embodiments, the intermediate transfer member binders are comprised of bisphenol-A-polycarbonate resins, commercially available as MAKROLON®, with a weight average molecular weight of from about 50,000 to about 500,000.

The in situ formed grafted fluorotelomer polyaniline is present in an amount of from about 3 to about 30 weight percent of the total weight of the ITB, and the polymeric binder is present in an amount of from about 70 to about 97 weight percent of the total weight of the ITB. Within the grafted polyaniline, the weight ratio of the grafted fluorotelomer and the polyaniline is from about 1/99 to about 50/50, or from about 20/80 to about 40/60.

Examples of additional components present in the intermediate transfer member are a number of known conductive components present in an amount of from about 3 to about 20 weight percent, such as a second polyaniline. In embodiments, the second polyaniline component has a relatively small particle size of, for example, from about 0.5 to about 5 microns, from about 1.1 to about 2.3 microns, from about 1.2 to about 2 microns, from about 1.5 to about 1.9 microns, or about 1.7 microns. Specific examples of the second polyaniline selected for the transfer member, such as an ITB, are PANIPOL™ F, commercially available from Panipol Oy, Finland.

For example, the fluorotelomer and the polyaniline can be dispersed in a fast cure thermosetting polyimide/N-methyl-2-pyrrolidone (NMP) solution resulting in an in situ formed grafted fluorotelomer polyaniline dispersed in a polyimide, and then the dispersion can be applied to, or coated on a glass plate using known draw bar coating methods. The resulting film or films can be dried at high temperatures, such as from about 100° C. to about 400° C., from about 150° C. to about 300° C., and from about 175° C. to about 200° C., for a sufficient period of time, such as for example, from about 20 to about 180 minutes, or from about 75 to about 100 minutes while remaining on the glass plate. After drying and cooling to room temperature, the film or films on the glass plate or separate glass plates are immersed into water overnight, about 18 to 23 hours, and subsequently, the 50 to 150 microns thick film or films formed are released from the glass resulting in the functional intermediate transfer member or members as disclosed herein.

In embodiments, the fluorotelomer and the polyaniline can be dispersed in a bisphenol-A-polycarbonate/copolyester of iso/terephthalic acid, dimethylpropanediol and ethanediol/methylene chloride ($CH_2Cl_2$) solution resulting in an in situ formed fluorotelomer grafted polyaniline dispersed in a polycarbonate/copolyester blend, and then the dispersion can be applied to or coated on a biaxially oriented poly(ethylene naphthalate) (PEN) substrate (KALEDEX™ 2000) having a thickness of 3.5 mils using known draw bar coating methods. The resulting film or films can be dried at high temperatures, such as from about 100° C. to about 200° C., or from about 120° C. to about 160° C. for a sufficient period of time, such as for example, from about 1 to about 30 minutes, or from about 5 to about 15 minutes, while remaining on the PEN substrate. After drying and cooling to room temperature, about 23° C. to about 25° C., the film or films on the PEN substrate or separate PEN substrates are automatically released from the substrate resulting in the functional intermediate transfer member or members as disclosed herein.

The disclosed intermediate transfer members are in, embodiments, weldable, that is the seam of the member like a belt, is weldable, and more specifically, may be ultrasonically welded to produce a seam. The surface resistivity of the disclosed intermediate transfer member is, for example, from about $10^9$ to about $10^{13}$, or from about $10^{10}$ to about $10^{12}$ ohm/sq. The sheet resistivity of the intermediate transfer weldable member is, for example, from about $10^9$ to about $10^{13}$, or from about $10^{10}$ to about $10^{12}$ ohm/sq.

The intermediate transfer members, illustrated herein like intermediate transfer belts, can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer, or it can be comprised of several layers, such as from about 2 to about 5 layers. In embodiments, the intermediate transfer member further includes an outer release layer.

Release layer examples include low surface energy materials such as TEFLON®-like materials including fluorinated ethylene propylene copolymer (FEP), polytetrafluoroethylene (PTFE), polyfluoroalkoxy polytetrafluoroethylene (PFA TEFLON®) and other TEFLON®-like materials; silicone materials such as fluorosilicones and silicone rubbers such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture with molecular weight of approximately 3,500); and fluoroelastomers such as those sold under the trade name VITON® such as copolymers and terpolymers of vinylidenefluoride, hexafluoropropylene and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®, (2) a class of terpolymers of vinylidenefluoride, hexafluoropropylene, and tetrafluoroethylene known commercially as VITON B®, and (3) a class of tetrapolymers of vinylidenefluoride, hexafluoropropylene, tetrafluoroethylene, and a cure site monomer such as VITON GF® having 35 mole percent of vinylidenefluoride, 34 mole percent of hexafluoropropylene, and 29 mole percent of tetrafluoroethylene with 2 percent cure site monomer. The cure site monomer can be those available from DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer.

The circumference of the intermediate transfer member, especially as it is applicable to a film or a belt configuration, is, for example, from about 250 to about 2,500 millimeters, from about 1,500 to about 3,000 millimeters, or from about 2,000 to about 2,200 millimeters with a corresponding width of, for example, from about 100 to about 1,000 millimeters, from about 200 to about 500 millimeters, or from about 300 to about 400 millimeters.

Specific embodiments will now be described in detail. These examples are intended to be illustrative, and are not limited to the materials, conditions, or process parameters set forth in these embodiments. All parts are percentages by weight of total solids unless otherwise indicated.

COMPARATIVE EXAMPLE 1

An intermediate transfer belt (ITB) member comprised of the polyaniline (PANI) was prepared as follows.

One gram of PANIPOL® F, a hydrochloric acid doped emeraldine salt obtained from Panipol Oy (Porvoo Finland), was mixed with 8 grams of MAKROLON® 5705, a known polycarbonate resin having a $M_w$ molecular weight average of from about 50,000 to about 100,000, commercially available from Farbenfabriken Bayer A.G., 1 gram of VITEL® 2200, a copolyester of iso/terephthalic acid, dimethylpropanediol, and ethanediol with a melting point of from about 302° C. to about 320° C. (degrees Centigrade), commercially available from Shell Oil Company, Houston, Tex., and 100 grams of methylene chloride. By ball milling this mixture with 2 millimeter stainless shot overnight, or 23 hours, a uniform dispersion was obtained.

The dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, about 23° C. to about 25° C., the film on the PEN substrate was automatically released from the substrate resulting in a 20 micron thick intermediate transfer member of polyaniline/polycarbonate/copolyester with a ratio by weight of 10/80/10.

EXAMPLE I

An intermediate transfer belt (ITB) member comprised of the disclosed hydrophobic fluorotelomer grafted polyaniline was prepared as follows.

0.83 Gram of PANIPOL® F, an emeraldine salt obtained from Panipol Oy (Porvoo Finland), was mixed with 8 grams of MAKROLON® 5705, a known polycarbonate resin having a $M_w$ molecular weight average of from about 50,000 to about 100,000, commercially available from Farbenfabriken Bayer A.G.; 1 gram of VITEL® 2200, a copolyester of iso/terephthalic acid, dimethylpropanediol, and ethanediol with the resulting mixture having a melting point of from about 302° C. to about 320° C. (degrees Centigrade), commercially available from Shell Oil Company, Houston, Tex.; and 0.17 gram of ZONYL® TELA-N ($M_w$ about 596, 60.6 percent of fluorine) available from DuPont, represented by $CF_3(CF_2)_nI$, where n is about 10. By ball milling this mixture with 2 millimeter stainless shot overnight, or 23 hours, a uniform dispersion was obtained. During this process, it is believed that the fluorotelomer is chemically attached onto the polyaniline surface in situ, rendering it hydrophobic and conductive as illustrated, for example, by the following contact angle and resistivity measurements.

The above resulting dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, the film on the PEN substrate was automatically released from the substrate resulting in a 20 micron thick intermediate transfer member of fluorotelomer-grafted-polyaniline/polycarbonate/copolyester with a ratio by weight of 10/80/10.

SURFACE RESISTIVITY MEASUREMENT

The above ITB members or devices of Comparative Example 1 and Example I were measured one day after their preparation for surface resistivity (averaging four to six measurements at varying spots, 72° F./65 percent room humidity) using a High Resistivity Meter (Hiresta-Up MCP-HT450 from Mitsubishi Chemical Corp.). Then the ITB devices were acclimated in A zone (80° F./80 percent humidity) for an aging study, and the surface resistivity was measured again at 1 month and 2 months. The results are provided in Table 1.

TABLE 1

| | Surface Resistivity After 1 Day (ohm/sq) | Surface Resistivity After 1 Month (ohm/sq) | Surface Resistivity After 2 Months (ohm/sq) |
|---|---|---|---|
| Comparative Example 1 | $(2.78 \pm 0.09) \times 10^9$ | $(4.35 \pm 0.24) \times 10^8$ | $(2.63 \pm 0.13) \times 10^8$ |
| Example 1 | $(4.96 \pm 0.21) \times 10^8$ | $(4.77 \pm 0.18) \times 10^8$ | $(4.56 \pm 0.08) \times 10^8$ |

The disclosed ITB possessed about 80 percent lower resistivity than the Comparative Example 1 ITB after day 1 primarily, it is believed, since the fluorotelomer is an oxidative dopant for the polyaniline rendering it less resistive. The fluorotelomer was in situ attached to the polyaniline surface by a nucleophilic substitution, or an oxidative doping process.

After 2 month aging in A zone, a stressful environment for ITB aging, the surface resistivity of the disclosed ITB device (Example I with 2 month aging in A zone) remained unchanged, while that of the polyaniline ITB device of Comparative Example 1 with 2 month aging in A zone decreased to about one tenth of its original value. The disclosed ITB device not only exhibited lower initial resistivity but remained electrically stable with accelerated aging with almost no change in surface resistivity due it is believed to the water repelling characteristics of the fluorotelomer-grafted-polyaniline.

CONTACT ANGLE MEASUREMENT

The advancing contact angles of water (in deionized water) of the ITB devices of Comparative Example 1 and Example I were measured at ambient temperature (about 23° C.), using the Contact Angle System OCA (Dataphysics Instruments GmbH, model OCA15. At least ten measurements were performed, and their averages are reported in Table 2.

TABLE 2

| | Contact Angle |
|---|---|
| Comparative Example 1 | 45 Degrees |
| Example I | 63 Degrees |

The disclosed ITB device (Example I) was significantly more hydrophobic (about 18 degrees higher contact angle) than the Comparative Example 1 ITB device with the untreated polyaniline.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprised of a substrate, and a layer comprised of polyaniline having grafted thereto a fluorotelomer represented by at least one of $R_F$—X and $R_F$—$R_H$—X wherein $R_F$ is a fluoroalkyl wherein alkyl contains from about 1 to about 30 carbon atoms; $R_H$ is an alkyl, an aryl, or an alkylaryl wherein alkyl contains from about 1 to about 18 carbon atoms and aryl contains from about 6 to about 36 carbon atoms; and X is fluoride, chloride, bromide or iodide.

2. An intermediate transfer member in accordance with claim 1 wherein said polyaniline has a particle size of from about 0.5 to about 5 microns.

3. An intermediate transfer member in accordance with claim 1 wherein alkyl contains from about 2 to about 8 carbon atoms, and wherein aryl contains from about 6 to about 18 carbon atoms.

4. An intermediate transfer member in accordance with claim 1 wherein said fluorotelomer grafted polyaniline is present in an amount of from about 3 to about 30 weight percent.

5. An intermediate transfer member in accordance with claim 1 wherein the ratio of said fluorotelomer to said polyaniline is from about 1/99 to about 50/50.

6. An intermediate transfer member in accordance with claim 1 wherein the ratio of said fluorotelomer to said polyaniline is from about 20/80 to about 40/60.

7. An intermediate transfer member in accordance with claim 1 wherein said fluorotelomer is present in an amount of from about 0.03 to about 15 percent by weight based on the weight of total solids.

8. An intermediate transfer member in accordance with claim 1 wherein said fluorotelomer is present in an amount of from about 0.6 to about 12 percent by weight based on the weight of total solids.

9. An intermediate transfer member in accordance with claim 1 wherein said member is a weldable belt.

10. An intermediate transfer member in accordance with claim 1 further including a second polyaniline present in an amount of from about 1 to about 30 percent by weight based on the weight of total solids.

11. An intermediate transfer member in accordance with claim 1 further including a second polymer selected from the group consisting of a polyimide, a polycarbonate, a polyamidimide, a polyphenylene sulfide, a polyamide, a polysulfone, a polyetherimide, a polyester or polyester copolymer, a polyvinylidene fluoride, a polyethylene-co-polytetrafluoroethylene, and mixtures thereof present in an amount of from about 70 to about 97 weight percent based on the weight of total solids.

12. An intermediate transfer member in accordance with claim 1 wherein said member has a surface resistivity of from about $10^7$ to about $10^{13}$ ohm/sq.

13. An intermediate transfer member in accordance with claim 12 wherein said surface resistivity is from about $10^8$ to about $10^{12}$ ohm/sq.

14. An intermediate transfer member in accordance with claim 1 further comprising an outer release layer positioned on said layer.

15. An intermediate transfer member in accordance with claim 14 wherein said release layer comprises a poly(vinyl chloride), a fluorinated ethylene propylene copolymer, a polytetrafluoroethylene, a polyfluoroalkoxy polytetrafluoroethylene, a fluorosilicone, a polymer of vinylidenefluoride, hexafluoropropylene and tetrafluoroethylene, or mixtures thereof.

16. An intermediate transfer member in accordance with claim 1 wherein said polyaniline is hydrophobic and conductive, and which polyaniline is a poly(p-phenyleneimineamine).

17. An intermediate transfer member in accordance with claim 1 wherein said polyaniline fluorotelomer is in the form of a layer contained on said substrate.

18. An intermediate transfer member comprised of a substrate, and a layer thereover comprised of polyaniline having crafted thereto a fluorotelomer represented by at least one of $$R_F—X \text{ and } R_F—R_H—X$$

wherein said $R_F$ is a perfluoroalkyl wherein alkyl contains from about 4 to about 14 carbon atoms, and $R_H$ is alkyl containing from about 2 to about 6 carbon atoms, and X is chloride, bromide or iodide.

19. An intermediate transfer member comprised of a substrate, and a layer thereover comprised of polyaniline having grafted thereto a fluorotelomer and wherein said fluorotelomer is represented by at least one of $CF_3(CF_2)_nI$, $CF_3(CF_2)_nCH_2CH_2I$, $CF_3(CF_2)_n(C_6H_4)CH_2I$, $CF_3(CF_2)_n(C_6H_4)CH_2Br$, and $CF_3(CF_2)_n(C_6H_4)CH_2Cl$, where n represents the number of repeating groups, and is a number of from about 3 to about 13.

20. An intermediate transfer member in accordance with claim 19 wherein said fluorotelomer is at least one of a perfluoroalkyl iodide, a perfluoroalkylethylene iodide, a perfluoroalkyl benzyl iodide, a perfluoroalkyl bromide, and a perfluoroalkyl chloride.

21. An intermediate transfer member in accordance with claim 19 wherein said fluorotelomer is a perfluorobutyl iodide, a perfluorodecyl iodide, or a perfluorobutyl benzyl chloride.

22. An intermediate transfer member in accordance with claim 19 wherein said fluorotelomer is $$CF_3(CF_2)_nI,$$

and wherein n is a number of from 8 to 12.

23. A transfer media comprised of a polyaniline having grafted thereto a fluorotelomer wherein said fluorotelomer is represented by $CF_3(CF_2)_nI$ wherein n represents the number of repeating groups of from about 3 to about 13.

24. A transfer media comprised of a polyaniline having grafted thereto a fluorotelomer wherein said fluorotelomer is represented by $CF_3(CF_2)_nCH_2CH_2I$ wherein n represents the number of repeating groups, and which n has a value of from about 3 to about 14.

25. An intermediate transfer member in accordance with claim 24 wherein said fluorotelomer, said polyaniline, and a second polymer are dispersed in a solvent, and said second polymer is selected from the group consisting of a polyimide, a polycarbonate, a polyamidimide, a polyphenylene sulfide, a polyamide, a polysulfone, a polyetherimide, a polyester, a polyvinylidene fluoride, a polyethylene-co-polytetrafluoroethylene, and mixtures thereof, and said solvent is selected from the group consisting of alkylene chloride, water, alcohols, ethers, ketones, esters, amides, benzene, toluene, xylene and monochlorobenzene.

* * * * *